(12) United States Patent
Huang et al.

(10) Patent No.: US 9,665,218 B2
(45) Date of Patent: May 30, 2017

(54) TOUCH PANEL WITH A SINGLE-LAYER LOW-COMPLEXITY TRANSPARENT ELECTRODE PATTERN AND SENSING METHOD THEREFOR

(71) Applicant: Orise Technology Co., Ltd., Hsinchu (TW)

(72) Inventors: Wen-Hsian Huang, Hsinchu (TW); Shih-Hsin Huang, Hsinchu (TW)

(73) Assignee: FOCALTECH SYSTEMS CO., LTD., Hsinchu (TW)

( * ) Notice: Subject to any disclaimer, the term of this patent is extended or adjusted under 35 U.S.C. 154(b) by 0 days.

(21) Appl. No.: 14/322,116

(22) Filed: Jul. 2, 2014

(65) Prior Publication Data

US 2015/0009174 A1 Jan. 8, 2015

(30) Foreign Application Priority Data

Jul. 2, 2013 (TW) ................................ 10213599 A

(51) Int. Cl.
*G06F 3/044* (2006.01)
*G06F 3/041* (2006.01)
*G06F 3/045* (2006.01)

(52) U.S. Cl.
CPC .............. *G06F 3/044* (2013.01); *G06F 3/045* (2013.01); *G06F 3/0416* (2013.01); *G06F 2203/04103* (2013.01)

(58) Field of Classification Search
CPC .......... G06F 1/00; G06F 3/044; G06F 3/0412; G06F 3/0416; G06F 2203/04103; G09G 1/00; G09G 3/3648; G09G 3/3233
See application file for complete search history.

(56) References Cited

U.S. PATENT DOCUMENTS

| | | | |
|---|---|---|---|
| 2011/0175847 A1* | 7/2011 | Wang et al. ................... | 345/174 |
| 2012/0019473 A1* | 1/2012 | Edwards ................ | G06F 3/044 345/174 |
| 2012/0206401 A1* | 8/2012 | Lin et al. ....................... | 345/174 |
| 2014/0147336 A1* | 5/2014 | Ching ................ | G01N 33/5438 422/69 |

\* cited by examiner

*Primary Examiner* — Michael Faragalla
(74) *Attorney, Agent, or Firm* — Bacon & Thomas, PLLC

(57) ABSTRACT

A touch panel with a single-layer low-complexity transparent electrode pattern includes a substrate, N sensing electrodes, and M conductive traces. The N sensing electrodes and the M conductive traces are formed on the substrate, where N and M are each a positive integer. Each conductive trace has a specific impedance value and is connected with two sensing electrodes. Any one of the N sensing electrodes is connected with at least another one sensing electrode through at least one conductive trace, such that each sensing electrode has a different RC time constant. N driving signals with different frequencies are sequentially applied to the N sensing electrodes via one of the N sensing electrodes to measure capacitance changes of the N sensing electrodes for detecting one touched sensing electrode.

14 Claims, 10 Drawing Sheets

TOUCH PANEL WITH A SINGLE-LAYER LOW-COMPLEXITY TRANSPARENT ELECTRODE PATTERN AND SENSING METHOD THEREFOR

BACKGROUND OF THE INVENTION

1. Field of the Invention

The present invention relates to the technical field of touch panels and, more particularly, to a touch panel with a singly-layer low-complexity transparent electrode pattern and the sensing method therefor.

2. Description of Related Art

The principle of touch panels is based on different sensing manners to detect a voltage, current, acoustic wave, or infrared to thereby detect the coordinates of touch points on a screen where a finger or external object touches. For example, a resistive touch panel uses a potential difference between the upper and lower electrodes to compute the position of a touched point for detecting the location of the touch point, and a capacitive touch panel uses a capacitance change generated in an electrostatic combination of the arranged transparent electrodes with a human body to generate a current or voltage for detecting touch coordinates.

FIG. 1 is a schematic view of a typical two-layer transparent electrode structure. In FIG. 1, the transparent electrodes are arranged in X-axis direction and Y-axis direction, and the two layers of the transparent electrodes are separated by a glass layer or a plastic layer. The advantage of the structure shown in FIG. 1 is that two or more touch points can be sensed and there is a good linearity. However, the disadvantage is that the material cost is high and the manufacturing process is complicated.

To overcome the high cost problem, a direct solution is to use a single-layer transparent electrode structure. FIG. 2 is a schematic view of a typical single-layer transparent electrode structure. As shown in FIG. 2, the structure is a single sensing layer of triangle pattern. A touch screen with the single-layer transparent electrode structure has the advantages of saving the material cost and simplifying the manufacturing process. Such a structure can carry out the two-dimensional coordinate recognition. However, when detecting two touch points, particularly two touch points on the same axial line, the two touch points may be erroneously determined to be one single touch point.

To overcome this, another typical single-layer transparent electrode structure is schematically shown in FIG. 3. The structure of FIG. 3 can carry out a real multi-touch detection while saving the material cost and simplifying the manufacturing process. However, the traces 31 in the structure of FIG. 3 are complicated, and the linearity is poor because the traces 31 occupy a significant amount of area. Taking a 4.3 inch multi-touch screen designed with a single-layer transparent electrode structure as an example, it needs approximately 12 sensing points in a horizontal direction and 20 sensing points in a vertical direction. In this case, there are 240 sensing points required in total for carrying out a multi-touch operation on the 4.3 inch multi-touch screen with a sufficient precision. Since every sensing point needs one sensing trace as a connection to the touch IC, there are 240 traces required for the 240 sensing points, resulting in that the traces arrangement is complicated and thus the pattern design is not easy.

Therefore, it is desirable to provide an improved single-layer transparent electrode structure to mitigate and/or obviate the afore-mentioned problems.

SUMMARY OF THE INVENTION

The object of the present invention is to provide a touch panel with a singly-layer low-complexity transparent electrode pattern and the sensing method therefor, which can provide a good precision on touch detection, increase the touch detection linearity, save the cost and simplify manufacturing process.

According to a feature of the invention, there is provided a touch panel with a single-layer low-complexity transparent electrode pattern, which includes a substrate; N sensing electrodes formed on the substrate, where N is a positive integer; and M conductive traces formed on the substrate, where M is a positive integer, each of the M conductive traces having a specific impedance, each conductive trace being connected with two sensing electrodes, any one of the N sensing electrodes being connected with at least another one sensing electrode through at least one conductive trace, such that each of the N sensing electrodes has a different resistor-capacitor time constant, wherein N driving signals with different frequencies are sequentially applied to the N sensing electrodes via one of the N sensing electrodes to measure capacitance changes of the N sensing electrodes thereby determining at least one touched sensing electrode.

According to another feature of the invention, there is provided a sensing method of sensing a touch panel with a singly-layer low-complexity transparent electrode pattern. The touch panel has a substrate, N sensing electrodes formed on the substrate, and M conductive traces formed on the substrate, where N and M are each a positive integer, each of the M conductive traces having a specific impedance value, any one the N sensing electrodes being connected with at least another one sensing electrode through at least one conductive trace, such that each of the N sensing electrodes has a different resistor-capacitor time constant. The sensing method includes the steps of: (A) sequentially applying N driving signals with different frequencies to the N sensing electrodes via one of the N sensing electrodes; (B) measuring capacitance changes of the N sensing electrodes for every applied driving signal; and (C) determining one touched sensing electrode from the N sensing electrodes according to the measured N times of capacitance changes.

According to further feature of the invention, there is provided a touch panel with a single-layer low-complexity transparent electrode pattern, which includes a substrate; and K columns of sensing electrodes formed on the substrate in a first direction, each column having L sensing electrodes, where K, L are each a positive integer, the L sensing electrodes being connected by L−1 conductive traces, each of the K columns being connected with a touch circuit via a resistor, each of the L−1 conductive traces having a specific impedance value, each conductive trace being connected with two sensing electrodes, such that each of the L sensing electrodes has a different resistor-capacitor time constant, wherein L driving signals with different frequencies are sequentially applied to the L sensing electrodes on each column via the resistors to measure capacitance changes of the L sensing electrodes for determining at least one touched sensing electrode.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
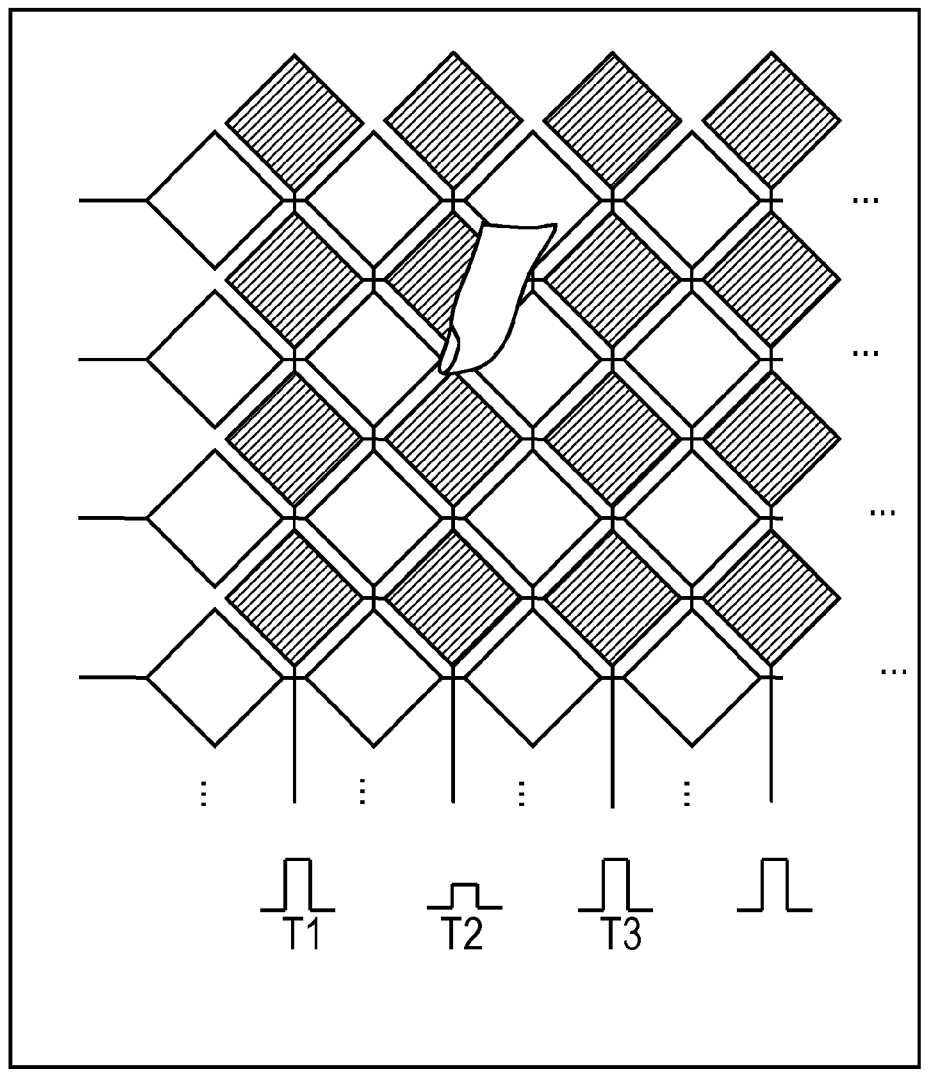
FIG. 1 is a schematic view of a typical two-layer transparent electrode structure.
Figure 2:
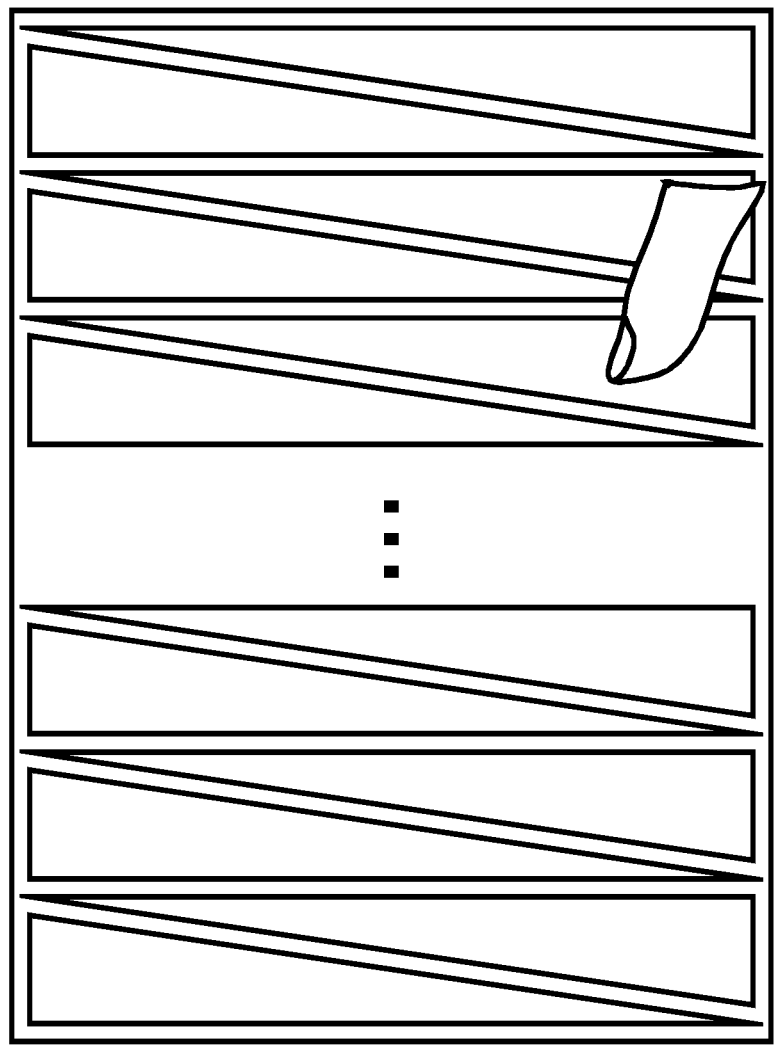
FIG. 2 is a schematic view of a typical single-layer transparent electrode structure.
Figure 3:
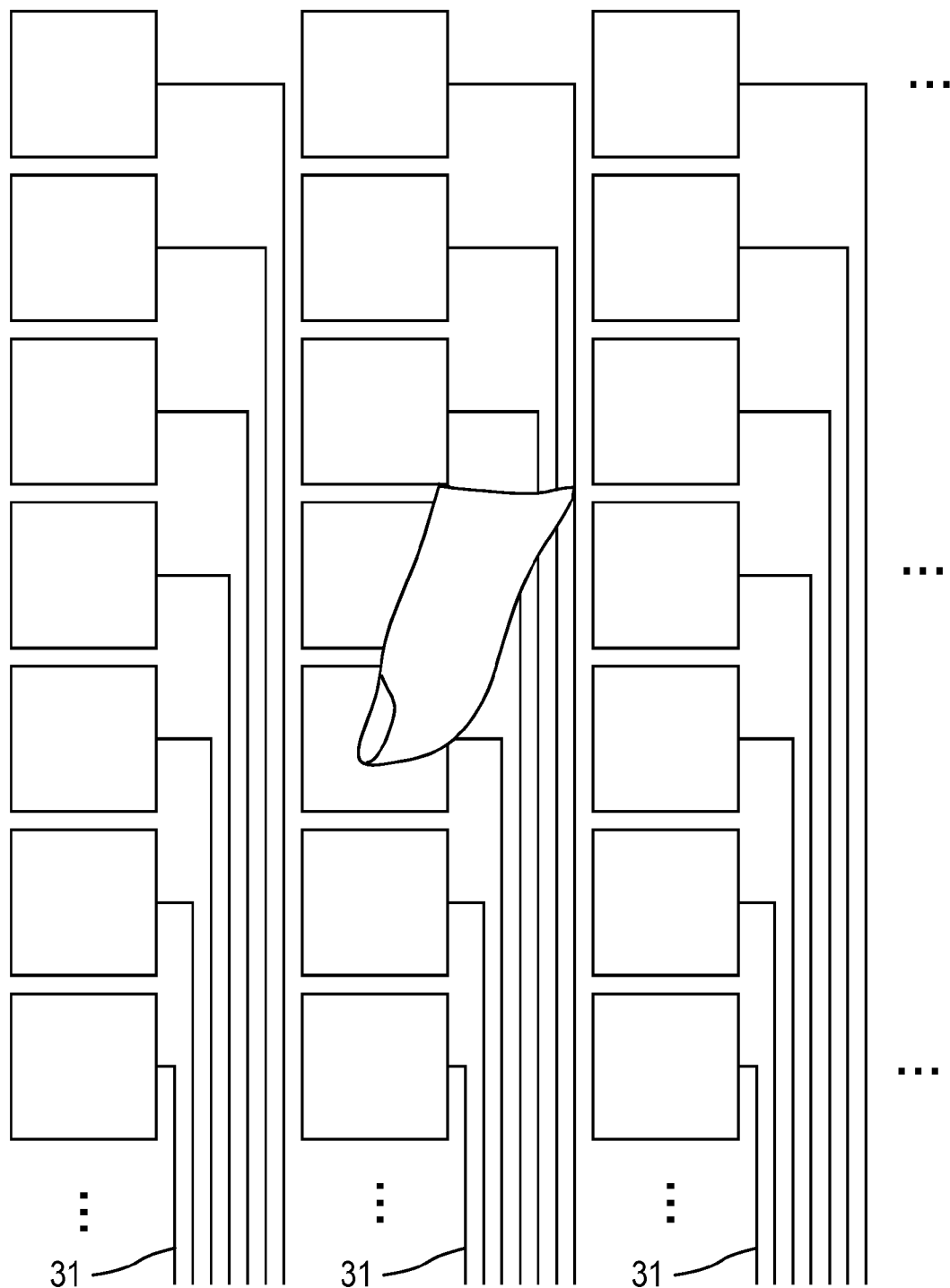
FIG. 3 is a schematic view of another typical single-layer transparent electrode structure.
Figure 4:
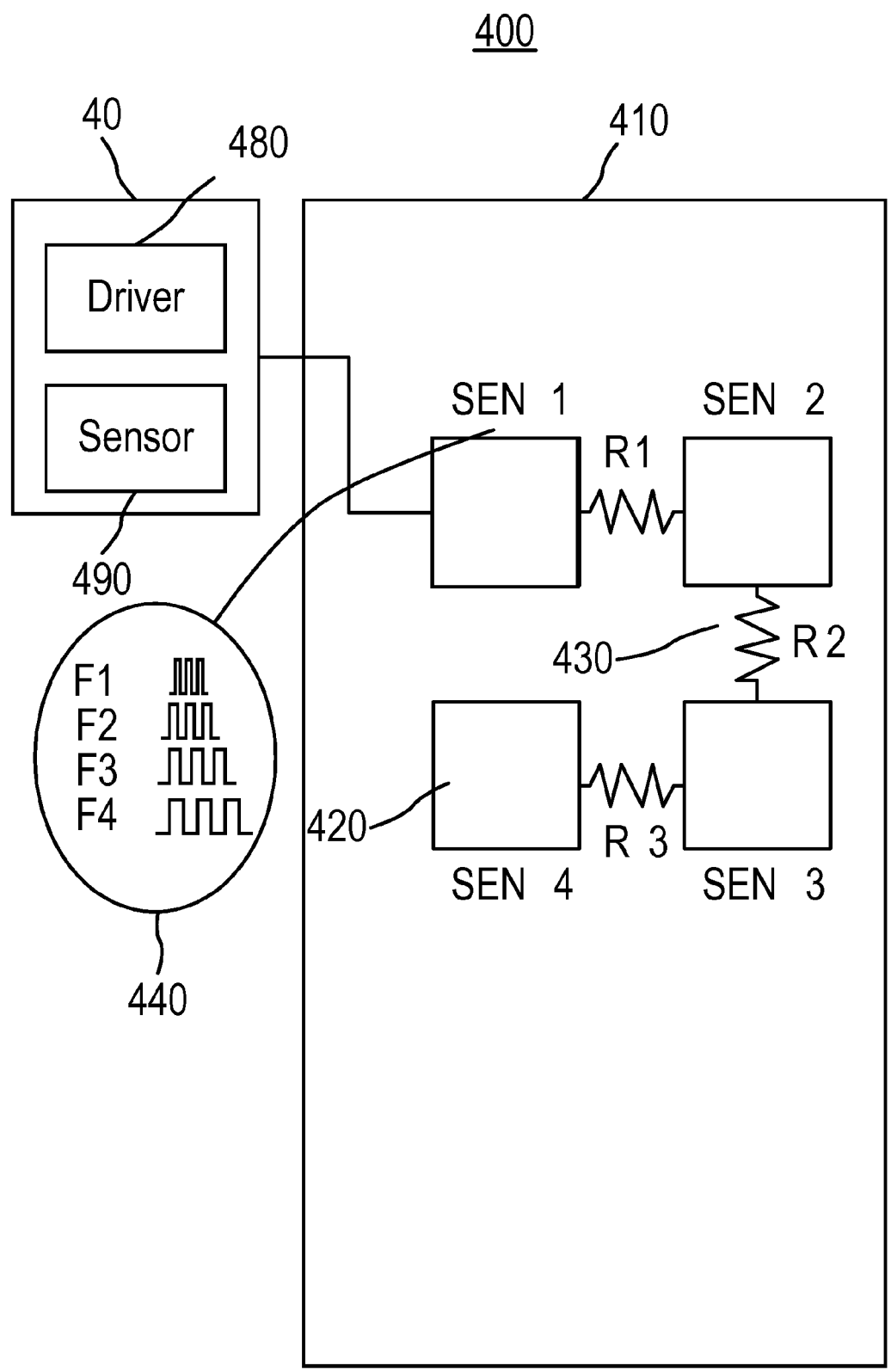
FIG. 4 is a schematic diagram of a touch panel with a single-layer low-complexity transparent electrode pattern according to the present invention.

FIG. 4 is a schematic diagram of a touch panel 400 with a single-layer low-complexity transparent electrode pattern according to the present invention. In FIG. 4, the panel 400 includes a substrate 410, N sensing electrodes 420, and M conductive traces 430, where N, M are each a positive integer. In this embodiment, for convenient description, N is 4 and M is 3.

The N sensing electrodes 420 and the M conductive traces 30 are formed on the substrate 410. Each of the M conductive traces 430 has a specific impedance value. In this embodiment, the specific impedance value is preferably a resistance value. Each conductive trace 430 is connected with two sensing electrodes 420. Any one of the N sensing electrodes 420 is connected with at least another one sensing electrode 420 through at least one conductive trace 430. Thus, each of the N sensing electrodes 420 has a different resistor-capacitor (RC) time constant; i.e., the RC time constant of each sensing electrode 420 is different from that of the other one. In this embodiment, as shown in FIG. 4, there are four sensing electrodes 420, denoted by SEN1, SEN2, SEN3 and SEN4, and three conductive traces 430 with resistance values R1, R2 and R3 formed on the substrate 410. The sensing electrode 420 denoted by SEN1 is connected with the sensing electrode 420 denoted by SEN2 through the conductive trace 430 having the resistance value R1. The sensing electrode 420 denoted by SEN2 is connected with the sensing electrode 420 denoted by SEN1 and the sensing electrode 420 denoted by SEN3 through the conductive trace 430 having the resistance value R1 and the conductive trace 430 having the resistance value R2, respectively. The sensing electrode 420 denoted by SEN3 is connected with the sensing electrode 420 denoted by SEN2 and the sensing electrode 420 denoted by SEN4 through the conductive trace 430 having the resistance value R2 and the conductive trace 430 having the resistance value R3, respectively. The sensing electrode 420 denoted by SEN4 is connected with the sensing electrode 420 denoted by SEN4 through the conductive trace 430 having the resistance value R3.

Corresponding to such a touch panel 400, a touch circuit 40 has a driver 480 to apply N driving signals 440 with different frequencies sequentially to the N sensing electrodes 420 via one of the N sensing electrodes 420. Further, the touch circuit 40 has a sensor 490 to sequentially measure capacitance changes of the N sensing electrodes 420 via the one sensing electrode 420, so as to determine a touched sensing electrodes 420. The N driving signals 440 are each a pulse signal preferably, and the j-th driving signal 440 has a frequency $F_j$ greater than a frequency $F_{j+1}$ of the (j+1)-th driving signal 440, where $1 \leq j \leq N-1$. Each of the N driving signals 440 has one to a predetermined number of pulses. In this embodiment, four driving signals 440 with frequencies $F_1$, $F_2$, $F_3$ and $F_4$, respectively, are applied, where $F_1 > F_2 > F_3 > F_4$, and the number of pulses for each driving signal is 3. More specifically, the driver 480 first applies the driving signal 440 with the frequency $F_1$ to the sensing electrodes 420 (SEN1, SEN2, SEN3, SEN4) via the sensing electrode 420 denoted by SEN1, and the sensor 490 detects the capacitance changes of the sensing electrodes 420 (SEN1, SEN2, SEN3, SEN4) via the sensing electrode 420 denoted by SEN1. Next, the driver 480 applies the driving signal 440 with the frequency $F_2$ to the sensing electrodes 420 (SEN1, SEN2, SEN3, SEN4) via the sensing electrode 420 denoted by SEN1, and the sensor 490 detects the capacitance changes of the sensing electrodes 420 (SEN1, SEN2, SEN3, SEN4) via the sensing electrode 420 denoted by SEN1. Then, the driver 480 applies the driving signal 440 with the frequency $F_3$ to the sensing electrodes 420 (SEN1, SEN2, SEN3, SEN4) via the sensing electrode 420 denoted by SEN1, and the sensor 490 detects the capacitance changes of the sensing electrodes 420 (SEN1, SEN2, SEN3, SEN4) via the sensing electrode 420 denoted by SEN1. Finally, the driver 480 applies the driving signal 440 with the frequency $F_4$ to the sensing electrodes 420 (SEN1, SEN2, SEN3, SEN4) via the sensing electrode 420 denoted by SEN1, and the sensor 490 detects the capacitance changes of the sensing electrodes 420 (SEN1, SEN2, SEN3, SEN4) via the sensing electrode 420 denoted by SEN1.

Figure 5:
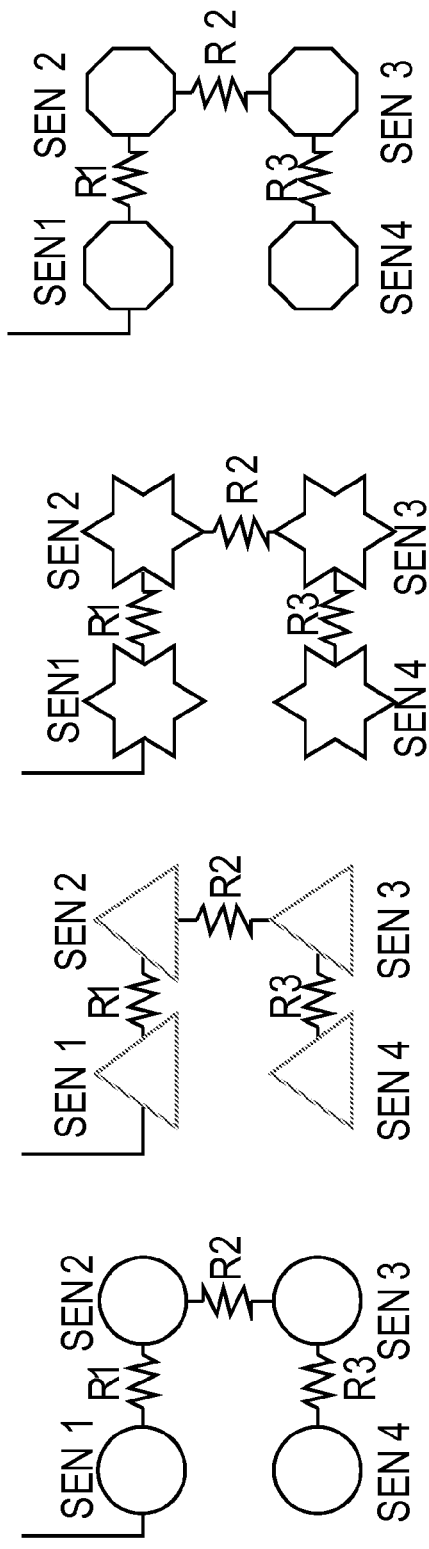
FIG. 5 is a schematic view of the pattern for the sensing electrodes according to the present invention.
Figure 5:
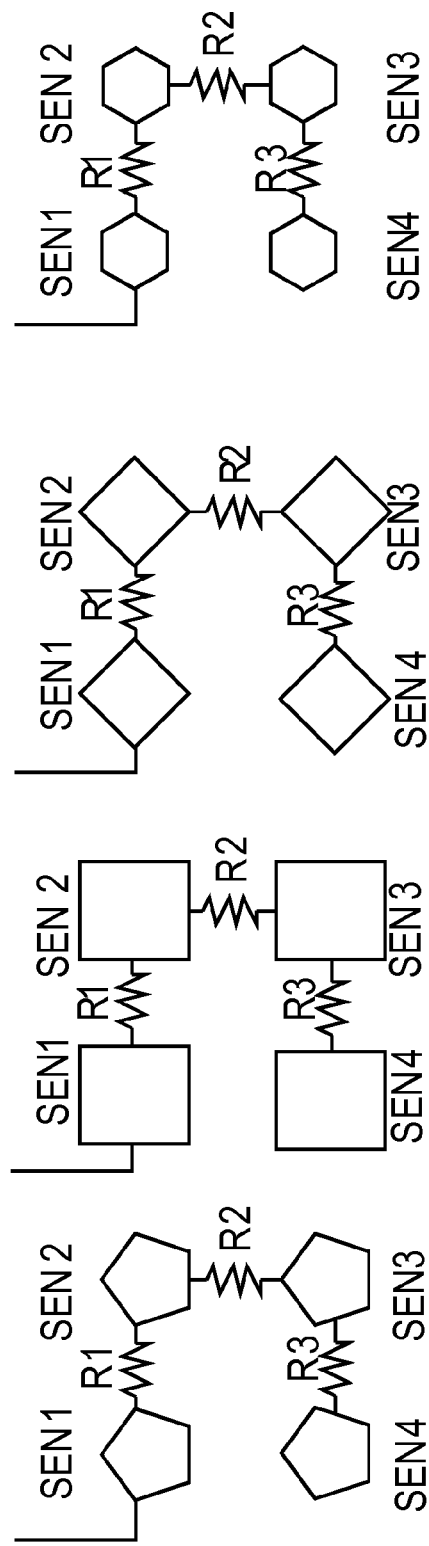

FIG. 5 is a schematic view of the pattern for the sensing electrodes 420 according to the present invention. As shown in FIG. 5, the N sensing electrodes 420 each can be of rectangle shape, square shape, diamond shape, circle shape, triangle shape, pentagon shape, hexagon shape, octagon shape, or hexagonal star shape.

The N sensing electrodes 420 each is a transparent sensing electrode comprised of a transparent conductive material selected from one of indium tin oxide (ITO), indium zinc oxide (IZO), zinc tin oxide, conductive high macromolecule, and carbon nanotube.

Figure 6:
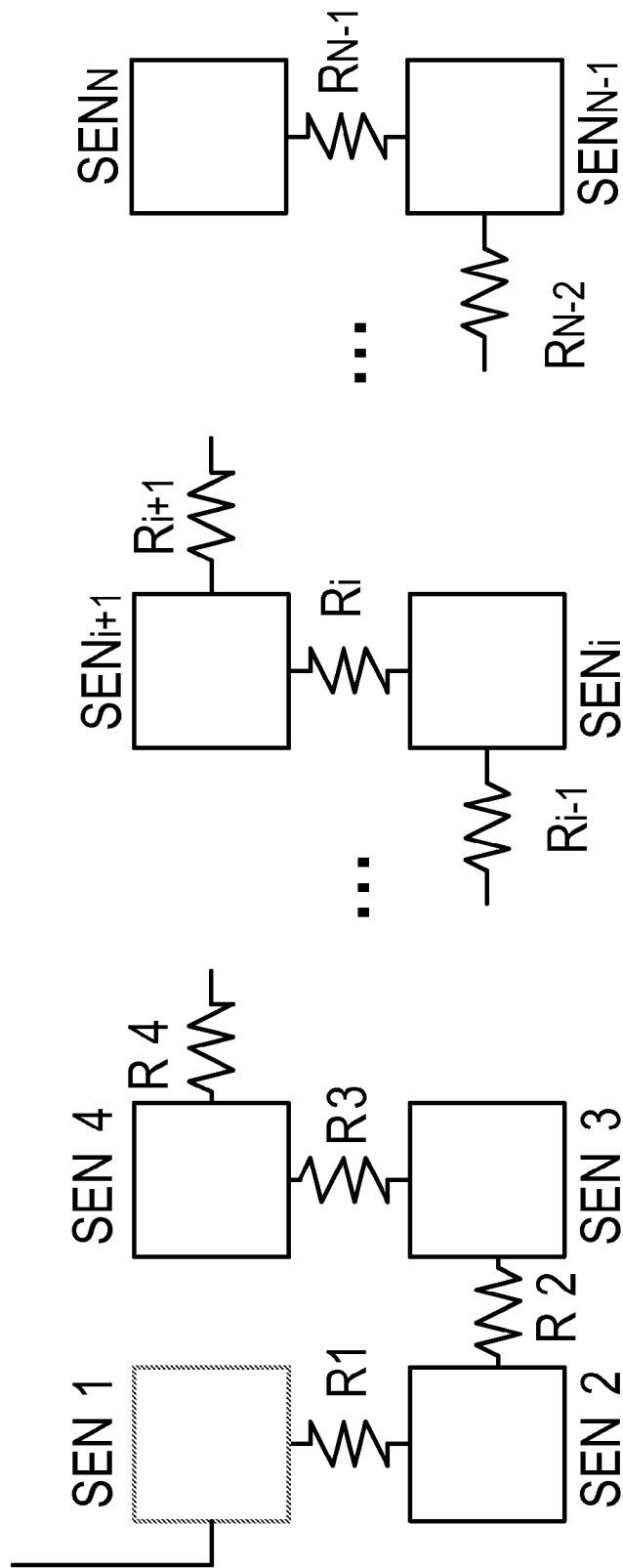
FIG. 6 is a schematic view of the sensing electrode pattern connection according to the present invention.

FIG. 6 is a schematic view of the sensing electrode pattern connection according to the present invention. As shown in FIGS. 4-6, the i-th conductive trace 430 (with a resistance value Ri) of the M conductive traces 430 is connected the i-th sensing electrode (denoted by SENi) and the (i+1)-th sensing electrode (denoted by SENi+1), so as to connect the N sensing electrodes 420 in series, where $1 \leq i \leq N-1$ and $N = M+1$.

Figure 7:
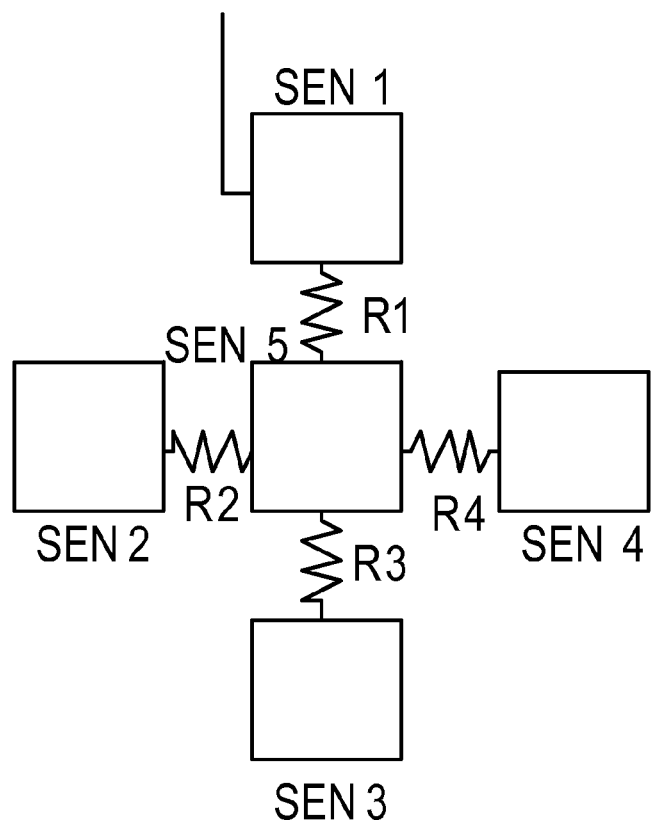
FIG. 7 is a schematic view of another sensing electrode pattern connection according to the present invention.
Figure 8:
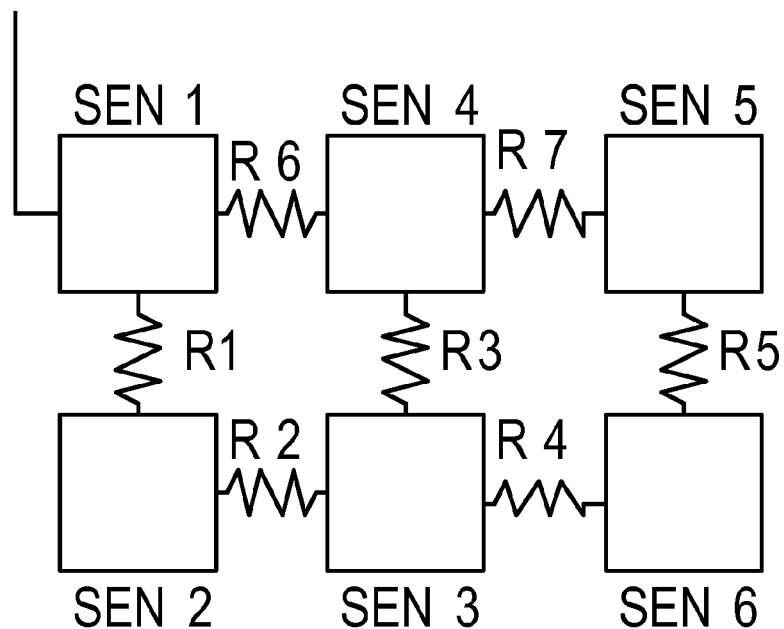
FIG. 8 is a schematic view of still another sensing electrode pattern connection according to the present invention.

FIG. 7 is a schematic view of another sensing electrode pattern connection according to the present invention. In FIG. 7, the sensing electrodes 420 are connected to form a star topology. FIG. 8 is a schematic view of still another sensing electrode pattern connection according to the invention. In FIG. 8, the sensing electrodes 420 are connected in both series and parallel so as to form a net topology.

In FIGS. 4-8, each of the M conductive traces 430 has its own specific impedance value. In this embodiment, the specific impedance value is preferably a resistance value and thus is equivalent to a resistor.

Figure 9:
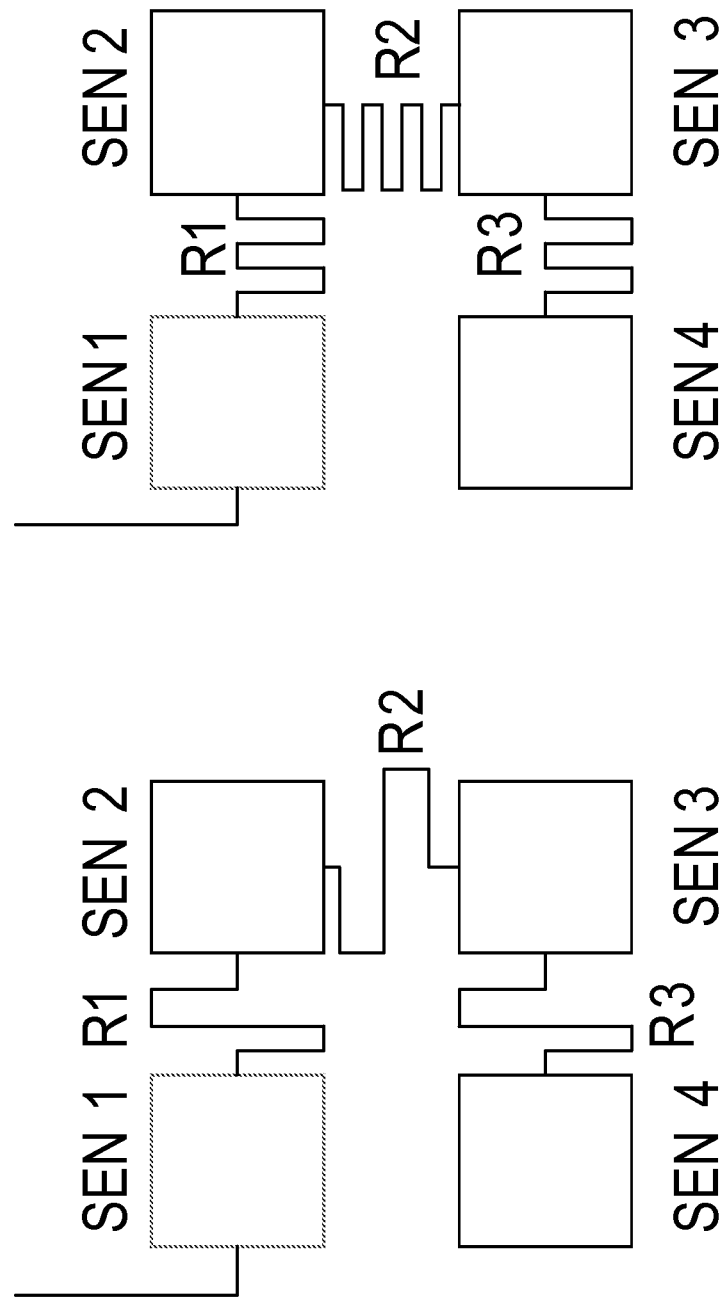
FIG. 9 is a schematic view of further another sensing electrode pattern connection according to the present invention.

FIG. 9 is a schematic view of further another sensing electrode pattern connection according to the invention, in which each of the M conductive traces 430 is of a zigzag shape to thereby have the desired resistance value.

Figure 10:
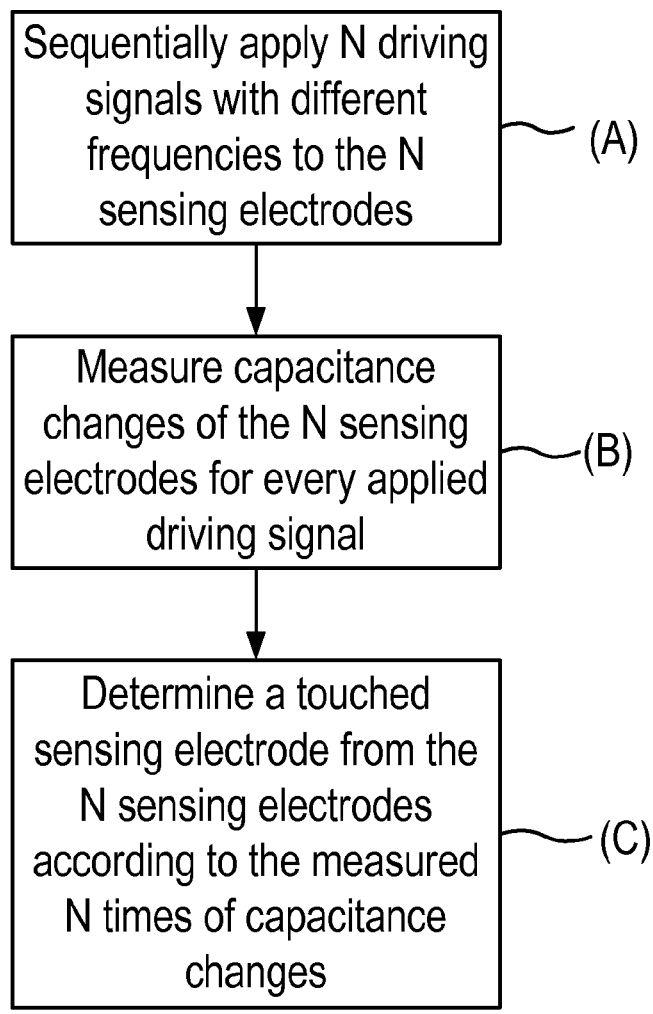
FIG. 10 is a flowchart of a sensing method for the touch panel with a single-layer low-complexity transparent electrode pattern according to the present invention.

FIG. 10 is a flowchart of a sensing method for the touch panel 400 with a single-layer low-complexity transparent electrode pattern according to the present invention. With reference to both FIGS. 4 and 10, the touch panel 400 has the substrate 410, the N sensing electrodes 420 formed on the substrate 410, and the M conductive traces 430 formed on the substrate 410, where N, M are each a positive integer. Each of the M conductive traces 430 has a specific impedance value, and preferably a resistance value. Each of the M conductive traces 430 is connected with two sensing electrodes 420. Any one of the N sensing electrodes 420 is connected with at least another one sensing electrode 420 through at least one conductive trace 430. Thus, each of the N sensing electrodes 420 has a different RC time constant. In step (A) of the method, the driver 480 first applies N driving signals 440 with different frequencies sequentially to the N sensing electrodes 420 via one of the N sensing electrodes 420, wherein the N driving signals 440 are each a pulse signal, and the frequency $F_j$ of a j-th driving signal 440 is greater than the frequency $F_{j+1}$ of a (j+1)-th driving signal 440, where $1 \leq j \leq N-1$. Each of the N driving signals 440 has one to a predetermined number of pulses, and in this embodiment the number of pulses for each driving signal is 3.

Specifically, the driver 480 first applies the driving signal 440 with the frequency $F_1$ to the sensing electrodes 420 (SEN1, SEN2, SEN3, SEN4) via the sensing electrode 420 denoted by SEN1, and the sensor 490 detects the capacitance changes of the sensing electrodes 420 (SEN1, SEN2, SEN3, SEN4) via the sensing electrode 420 denoted by SEN1; next, the driver 480 applies the driving signal 440 with the frequency $F_2$ to the sensing electrodes 420 (SEN1, SEN2, SEN3, SEN4) via the sensing electrode 420 denoted by SEN1, and the sensor 490 detects the capacitance changes of the sensing electrodes 420 (SEN1, SEN2, SEN3, SEN4) via the sensing electrode 420 denoted by SEN1; then, the driver 480 applies the driving signal 440 with the frequency $F_3$ to the sensing electrodes 420 (SEN1, SEN2, SEN3, SEN4) via the sensing electrode 420 denoted by SEN1, and the sensor 490 detects the capacitance changes of the sensing electrodes 420 (SEN1, SEN2, SEN3, SEN4) via the sensing electrode 420 denoted by SEN1; finally, the driver 480 applies the driving signal 440 with the frequency $F_4$ to the sensing electrodes 420 (SEN1, SEN2, SEN3, SEN4) via the sensing electrode 420 denoted by SEN1, and the sensor 490 detects the capacitance changes of the sensing electrodes 420 (SEN1, SEN2, SEN3, SEN4) via the sensing electrode 420 denoted by SEN1.

Figure 11:
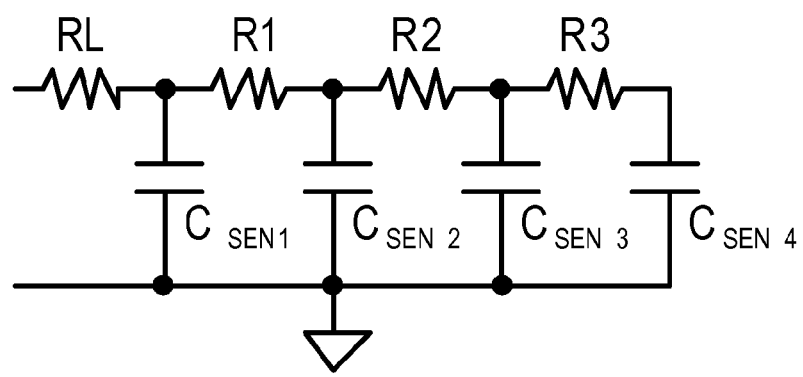
FIG. 11 is an equivalent circuit of the sensing electrodes and conductive traces of FIG. 4.

FIG. 11 is an equivalent circuit of the sensing electrodes 420 and the conductive traces 430, in which four sensing electrodes denoted by SEN1-SEN4 and three conductive traces 430 with resistance values R1-R3 are taken as an example to describe the circuit. However, upon the disclosure of the present invention, those skilled in the art can extend the number of the sensing electrodes 420 to N, and a detailed description therefor is deemed unnecessary. As shown in FIGS. 4 and 11, the four sensing electrodes 420 are connected by the conductive traces or resistors. The desired resistors (R1, R2, R3) are placed among the four sensing electrodes 420 so as to form the equivalent circuit of FIG. 11. The impedance between the touch circuit 40 and the first sensing electrode 429 denoted by SEN1 is RL. The equivalent capacitance between the sensing electrode 420 denoted by SEN1 and the ground is $C_{SEN1}$. The equivalent capacitance between the sensing electrode 420 denoted by SEN2 and the ground is $C_{SEN2}$. The equivalent capacitance between the sensing electrode 420 denoted by SEN3 and the ground is $C_{SEN3}$. And, the equivalent capacitance between the sensing electrode 420 denoted by SEN4 and the ground is $C_{SEN4}$.

Because $R3C_{SEN4}$, $R2C_{SEN3}$, $R1C_{SEN2}$, and $RLC_{SEN1}$ are different RC time constants, these RC time constants can be designed as $R3C_{SEN4} > R2C_{SEN3} > R1C_{SEN2} > RLC_{SEN1}$, which indicates that each capacitance $C_{SEN}$ has a different detectable frequency range. Namely, in this case, $R3C_{SEN4}$ has a highest detectable frequency $F_4$. $R2C_{SEN3}$ has a highest detectable frequency $F_3$. $R2C_{SEN2}$ has a highest detectable frequency $F_2$. And, $RLC_{SEN1}$ has a highest detectable frequency $F_4$. Due to the time constant design and the relation of $F_4 < F_3 < F_2 < F_1$, only the change of the capacitance $C_{SEN1}$ can be detected when the detecting frequency is $F_1$, while the changes of the capacitance $C_{SEN2}$ to $C_{SEN4}$ cannot be detected by the frequency $F_1$ because their time constants are too high. Similarly, the frequency $F_2$ can detect the change of the capacitances $C_{SEN1}$ to $C_{SEN2}$ and cannot detect the changes of the capacitances $C_{SEN3}$ and $C_{SEN4}$. Similarly, the frequency $F_3$ can detect the changes of the capacitances $C_{SEN1}$ and $C_{SEN3}$ and cannot detect the change of the capacitance $C_{SEN4}$. Similarly, the frequency $F_4$ can detect the changes of the capacitances $C_{SEN1}$ to $C_{SEN4}$. Thus, by respectively applying the driving signals 440 with frequencies $F_1$ to $F_4$, it is able to obtain the changes of the capacitances $C_{SEN1}$ to $C_{SEN4}$ so as to find the location of the touch point.

In step (B), for every applied driving signal 440, the sensor 490 measures the capacitance changes corresponding to the N sensing electrodes 420. Namely, in this embodiment, for the applied driving signal 440 with the frequency $F_1$, the sensor 490 detects the capacitance changes of the sensing electrodes 420 (SEN1, SEN2, SEN3, SEN4) via the sensing electrode 420 denoted by SEN1. For the applied driving signal 440 with the frequency $F_2$, the sensor 490 detects the capacitance changes of the sensing electrodes 420 (SEN1, SEN2, SEN3, SEN4) via the sensing electrode 420 denoted by SEN1. For the applied driving signal 440 with the frequency $F_3$, the sensor 490 detects the capacitance changes of the sensing electrodes 420 (SEN1, SEN2, SEN3, SEN4) via the sensing electrode 420 denoted by SEN1. For the applied driving signal 440 with the frequency $F_4$, the sensor 490 detects the capacitance changes of the sensing electrodes 420 (SEN1, SEN2, SEN3, SEN4) via the sensing electrode 420 denoted by SEN1. Finally, in step (C), according to the measured N times of capacitance changes, it detects at least one touched sensing electrode 420 of the N sensing electrodes 420.

Since the values of $R3C_{SEN4}$, $R2C_{SEN3}$, $R1C_{SEN2}$, and $RLC_{SEN1}$ can be designed in advance, the touch circuit 40 can pre-apply the driving signal 440 with the frequency $F_1$ to the four sensing electrodes 420 (SEN1, SEN2, SEN3, SEN4) and the three conductive traces 430 (R1, R2, R3) and measure the change of the capacitance $C_{SEN1}$ when the sensing electrode 420 denoted by SEN1 is in contact and when the sensing electrode 420 denoted by SEN1 is not in contact. The touch circuit 40 pre-applies the driving signal 440 with the frequency $F_2$ to the four sensing electrodes 420 (SEN1, SEN2, SEN3, SEN4) and the three conductive traces 430 (R1, R2, R3) and measures the changes of the capacitances $C_{SEN1}$ and $C_{SEN2}$ when the sensing electrodes 420 denoted by SEN1 and SEN2 are in contact and when the sensing electrodes 420 denoted by SEN1 and SEN2 are not in contact. Similarly, the touch circuit 40 sequentially pre-applies the driving signals 440 with the frequencies $F_3$ and $F_4$ to the four sensing electrodes 420 (SEN1, SEN2, SEN3, SEN4) and the three conductive traces 430 (R1, R2, R3), so as to obtain the changes of the capacitances $C_{SEN1}$, $C_{SEN2}$, $C_{SEN3}$, $C_{SEN4}$, respectively. The touch circuit 40 can save the capacitance changes in a table, such that, in step (C), the touched sensing electrode 420 of the N sensing electrode 420 can be determined according to the measured N times of capacitance changes.

Figure 12:
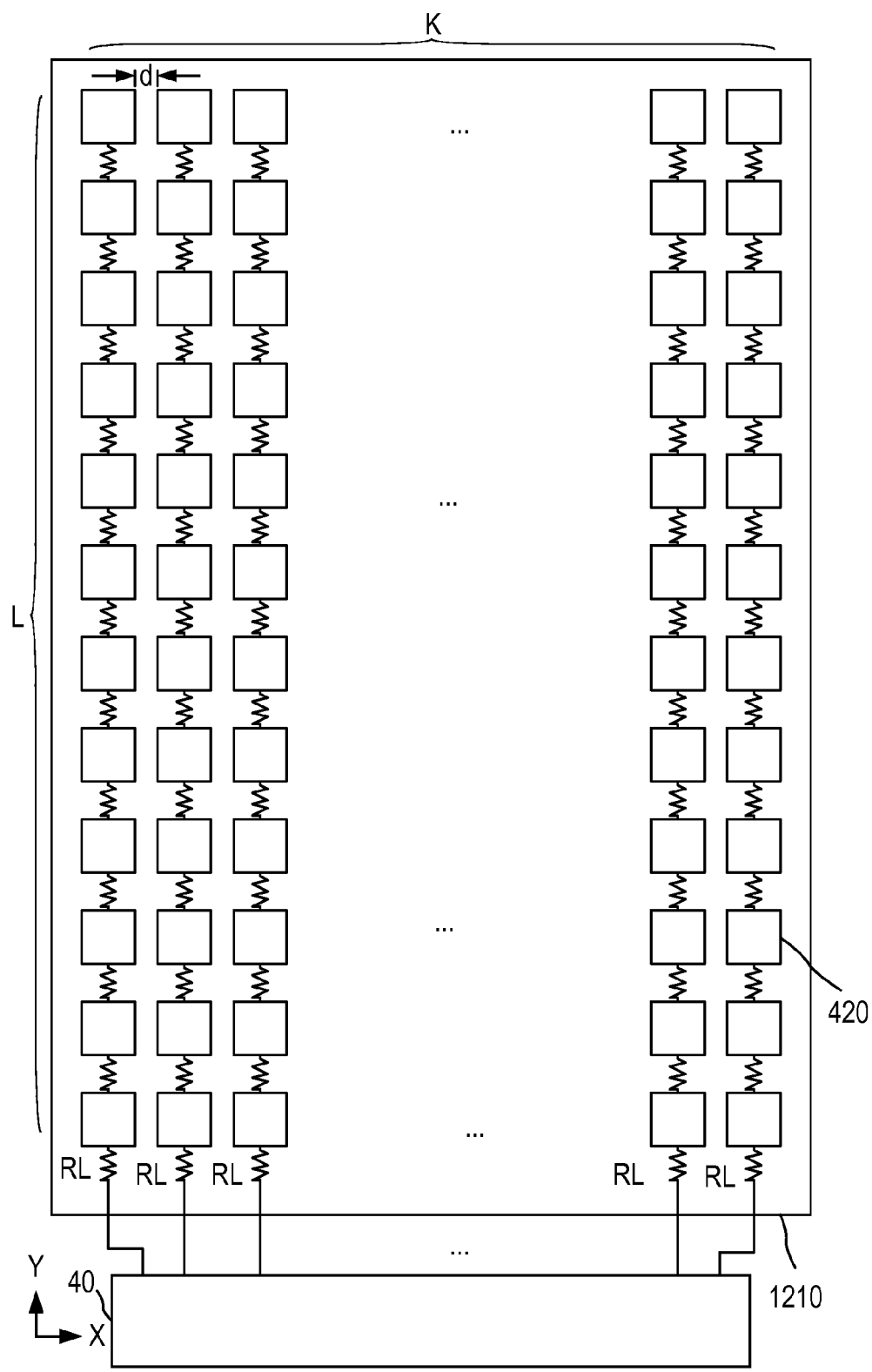
FIG. 12 schematically illustrates an application of the touch panel with a single-layer low-complexity transparent electrode pattern according to the present invention.

FIG. 12 schematically illustrates an application of the touch panel 400 with a single-layer low-complexity transparent electrode pattern according to the present invention. As shown in FIG. 12, the touch panel 400 has the sensing electrodes 420 divided into K columns on the substrate in a first direction (X-axis), and each column has L sensing electrodes 420, where K, L are each a positive integer. The L sensing electrodes 420 on each column are connected by L−1 conductive traces. Each of the K columns is connected with the touch circuit 40 via a resistor RL. Each of the L−1 conductive traces has a specific impedance value, and each conductive trace is connected with two sensing electrodes. As shown in FIG. 12, similar to the previous embodiment, at least one touched sensing electrode can be determined with the use of this touch panel 400 and, when the number of the sensing electrodes 420 is large, a distance 'd' from one sensing electrode 420 to another sensing electrode 420 can be effectively reduced, so that the sensing electrodes 420 can cover a larger area thereby providing an excellent precision in touch detection, as well as increasing the touch detection linearity.

In view of the foregoing, it is known that the present invention adds the impedance between the sensing points for connecting the sensing points so as to simplify the pattern design. Since the sensing electrodes 420 are connected, resistors are added to detect which sensing electrode 420 is touched. In addition, each sensing electrode 420 can be equivalent to a capacitor, so that the desired resistors are added between the sensing electrodes 420 to thereby detect the touch point by using the feature of a RC low pass filter, i.e., the sensing electrodes 420 inputted with signals of different frequencies have different amounts of signal.

In summary, the present invention uses the conductive traces to connect the sensing electrodes to form a single-layer low-complexity transparent electrode pattern. Thus, the distance between the sensing electrodes is effectively reduced so as to increase the area covered by the sensing electrodes thereby providing an excellent precision in touch detection, increasing the touch detection linearity, saving the cost, and simplifying the manufacturing process.

Although the present invention has been explained in relation to its preferred embodiment, it is to be understood that many other possible modifications and variations can be made without departing from the spirit and scope of the invention as hereinafter claimed.

What is claimed is:
1. A touch panel with a single-layer low-complexity transparent electrode pattern, comprising:
a substrate;
N sensing units, formed on the substrate, each sensing unit comprising a conductive resistance trace and a sensing electrode, each of the conductive resistance traces having a specific and unique impedance value and being connected with the sensing electrodes of two neighboring sensing units, any one of the sensing electrodes being connected with at least another one sensing electrode through at least one conductive resistance trace, such that the sensing units are connected in series and each of sensing units has a resistor-capacitor time constant different from that of the other sensing units, where N is a positive integer,
wherein N driving signals with different frequencies are sequentially applied to the N sensing units via one of the N sensing units to measure capacitance changes of the N sensing units thereby determining if there is at least one of the N sensing units touched.

2. The touch panel as claimed in claim 1, wherein an i-th conductive resistance trace is connected with an i-th sensing electrode and an (i+1)-th sensing electrode so as to connect the N sensing electrodes in series, where 1≤i≤N−1.

3. The touch panel as claimed in claim 1, wherein the N sensing electrodes are transparent sensing electrodes.

4. The touch panel as claimed in claim 3, wherein the N transparent sensing electrodes are comprised of transparent conductor material.

5. The touch panel as claimed in claim 4, wherein the transparent conductor material is indium tin oxide, indium zinc oxide, zinc tin oxide, conductive high macromolecule, or carbon nanotube.

6. The touch panel as claimed in claim 1, wherein each of the N sensing electrodes is a rectangle shape, a square shape, a diamond shape, a circle shape, a triangle shape, a hexagon shape, an octagon shape, or a hexagonal star shape.

7. The touch panel as claimed in claim 6, wherein each of the conductive resistance traces is formed of a resistor.

8. The touch panel as claimed in claim 6, wherein each of the conductive resistance traces is of a zigzag shape to have a desired resistance value.

9. The touch panel as claimed in claim 2, wherein a j-th driving signal has a frequency Fj greater than a frequency Fj+1 of a (j+1)-th driving signal, where 1≤j≤N−1.

10. A sensing method for a touch panel with a singly-layer low-complexity transparent electrode pattern, the touch panel having a substrate, N sensing units formed on the substrate, where N is a positive integer, each sensing unit comprising a conductive resistance trace and a sensing electrode, each of the conductive resistance traces having a specific and unique impedance value, any one the N sensing electrodes being connected with at least another one sensing electrode through at least one conductive resistance trace, such that the N sensing units are connected in series and each of the N sensing units has a resistor-capacitor time constant different from that of the other sensing units, the sensing method comprising the steps of:
(A) sequentially applying N driving signals with different frequencies to the N sensing units via one of the N sensing units;
(B) measuring capacitance changes of the N sensing units for every applied driving signal; and
(C) determining one touched sensing unit from the N sensing units according to the measured N times of capacitance changes.

11. The sensing method as claimed in claim 10, wherein a j-th driving signal has a frequency Fj greater than a frequency Fj+1 of a (j+1)-th driving signal, where 1≤j≤N−1.

12. The sensing method as claimed in claim 10, wherein each of the N driving signals is a pulse signal.

13. The sensing method as claimed in claim 12, wherein each of the N driving signals has one to a predetermined number of pulses.

14. A touch panel with a single-layer low-complexity transparent electrode pattern, comprising:
- a substrate; and
- K columns of sensing units, formed on the substrate in a first direction, each column having L sensing units, each sensing unit comprising a conductive resistance trace and a sensing electrode, the L sensing electrodes being connected by L−1 conductive resistance traces, each of the K columns being connected with a touch circuit via a first sensing unit, each of the conductive resistance traces having a specific and unique impedance value, each conductive resistance trace being connected with the sensing electrodes of two neighboring sensing units, such that each of the L sensing units has a resistor-capacitor time constant different from that of the other sensing units and the L sensing units of one column are connected in series, where K, L are each a positive integer;
- wherein L driving signals with different frequencies are sequentially applied to the L sensing units on each column via the first sensing unit to measure capacitance changes of the L sensing units for determining if there is at least one of the sensing units touched.

* * * * *